Figure 1:
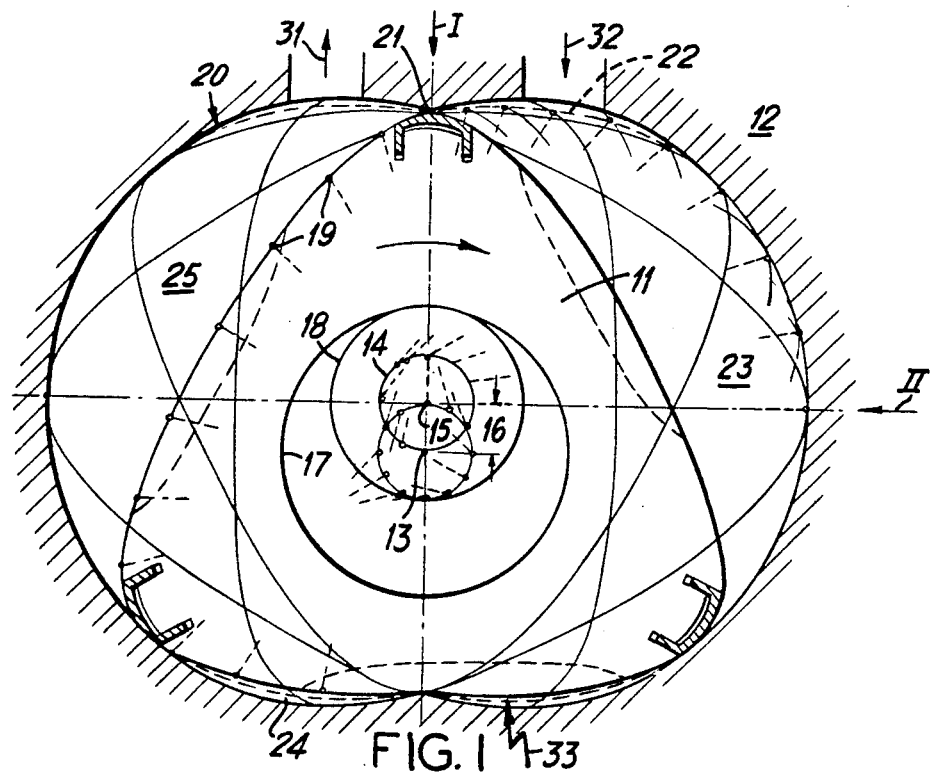

June 6, 1967     O. KRAIC ET AL     3,323,498

ROTARY INTERNAL COMBUSTION ENGINE

Filed June 2, 1965     3 Sheets-Sheet 1

INVENTORS.
OTTO KRAIC
KAREL VENYGR

ATTORNEY.

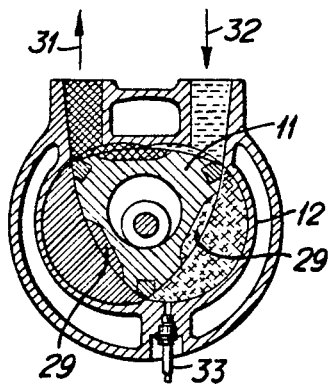
FIG.3
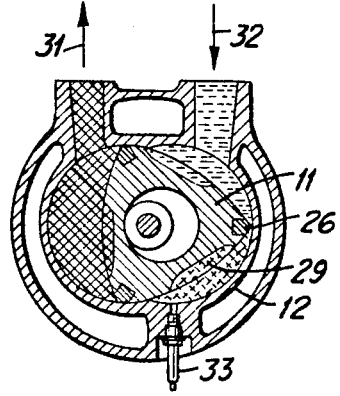
FIG. 4
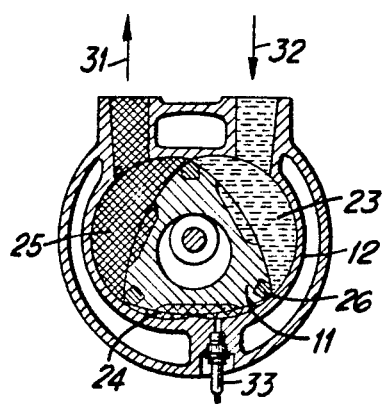
FIG.5
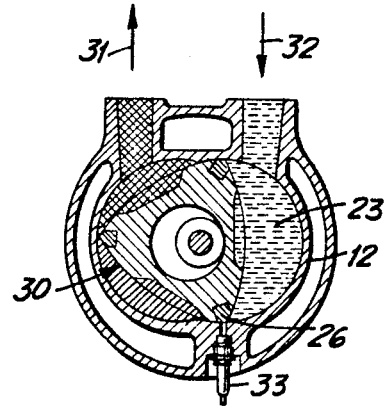
FIG.6
SUCTION   COMPRESSION   EXPANSION   EXHAUST
          IGNITION
INVENTORS.
OTTO KRAIC
KAREL VENYGR
BY
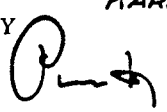
ATTORNEY

INVENTORS.
OTTO KRAIC
KAREL VENYGR

United States Patent Office 3,323,498
Patented June 6, 1967

3,323,498
ROTARY INTERNAL COMBUSTION ENGINE
Otto Kraic and Karel Venygr, Prague, Czechoslovakia, assignors to Ustav pro vyzkum motorovych vozidel, Prague, Czechoslovakia, a corporation of Czechoslovakia
Filed June 2, 1965, Ser. No. 460,720
4 Claims. (Cl. 123—8)

Our invention relates to a rotary internal combustion motor of the trochoidal type in which by the relative rotation of two profiled elements, namely of a piston within the cavity of a casing, individual working chambers of variable volume are formed therebetween.

Among the quite great number of known trochoidal type motors the simplest and most suitable are those in which a triangular piston body performs a composite rotary and planetary motion within a two-lobed cavity of an engine block. In such motors, the angular speed of the piston is combined with the speed of an eccentrical shaft in a ratio 1:3 for example by means of a toothed gearing having a transmission ratio 2:3.

The before said trochoidal type motors are of two basic sub-types which are kinematically identical but inverse as far as their geometrical solutions are concerned. Representative of these sub-types are, respectively, (a) Maillard's machine disclosed in the British Patent No. 583,035 (no U.S. equivalent having been found); in this machine a hypotrochoidal piston circulates in the cavity of a stationary machine block, the inner surface thereof being the outer envelope of the circulating piston, and (b) Wankel's machine disclosed in U.S. Patents No. 2,988,008 and 2,988,065; in this engine a triangular piston circulates within an epitrochoidal cavity of a stationary block, the piston surface having approximately the shape of the inner envelope of the epitrochoidal cavity if it is assumed that the same circulates.

In the above referred to sub-type (a) a continuous sealing contact exists not only between the apexes of the circulating hypotrochoidal piston and the inner surface of the cavity but also between surface portions of the circulating piston and of said cavity. In the above referred to sub-type (b) however, a continuous sealing contact exists only between the apexes of the circulating piston and the epitrochoidal inner surface of the cavity.

Up to now it was believed that machines of the sub-type (a) in which a hypotrochoidal piston circulates in a planetary manner in a cavity having an inner surface being the exact envelope of the circulating piston, can be constructed only as rotary compressors or a two-cycle motors, but not as four-cycle combustion motors. It was assumed that the application of a hypotrochoidal piston, whether or not provided with sealing elements, cannot result in the formation of the required number of properly distributed and mutually separated individual working chambers between the rotating piston and the inner surface of the cavity permitting an operation in four cycles.

It is an object of the present invention to provide a rotary combustion motor of the above defined sub-type (a) which can operate in four cycles and which in fact operates more efficiently than motors of the sub-type (b).

The combination according to our invention includes vaulted sealing edges which are resiliently mounted in the apexes of the hypotrochoidal piston and which have hypotrochoidal side surfaces forming an extension of and a complement to the hypotrochoidal surface of the piston; thereby a continuous broad sealing contact with the inner surface of the working chamber is assured. Thus improved sealing edges have the additional advantage that they are properly stabilized and are, as well as the enveloping inner surface of the cavity, exposed to minimal wear.

We also provide in the hypotrochoidal side surface of the triangular piston conventional pockets serving as combustion chambers. In distinction from present practice we locate these pockets not centrally in said hypotrochoidal side surfaces of the piston but in the direction of its rotation closer to the rearward sealing edge thus leaving a wider portion of the undisturbed hypotrochoidal surface portions near the forward sealing edge. This not only critically improves the actual sealing between the forming individual working chambers but also permits higher compressions and better scavenging.

The said and other objects of our invention will be more fully understood from the following specification when read with the accompanying drawing.

Figure 2:
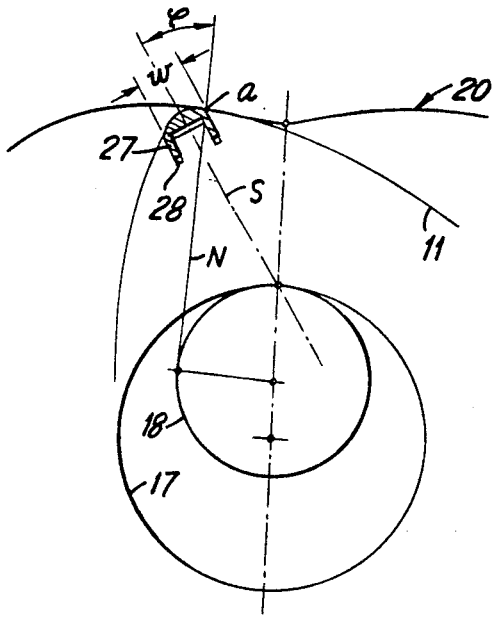
Figure 7:
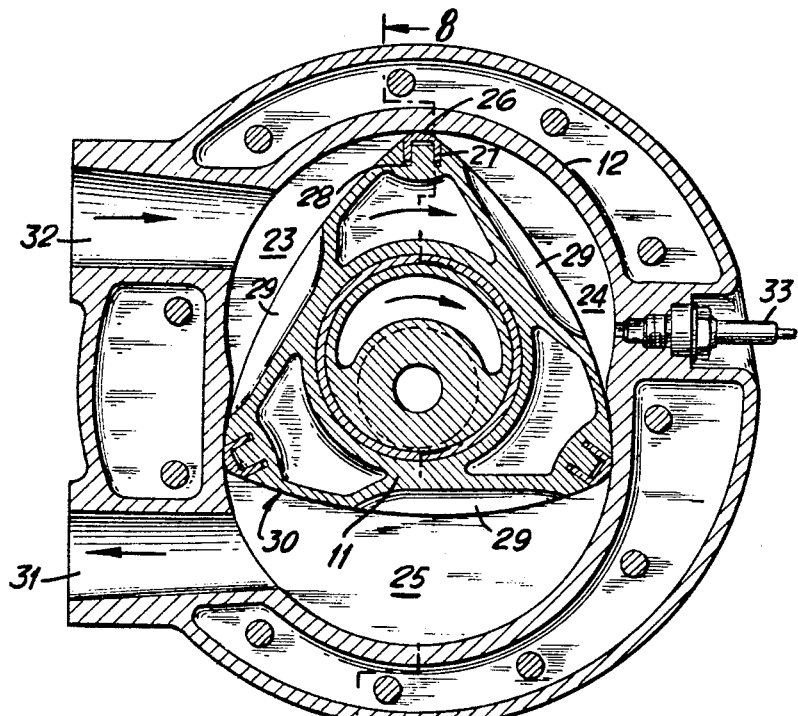
Figure 8:
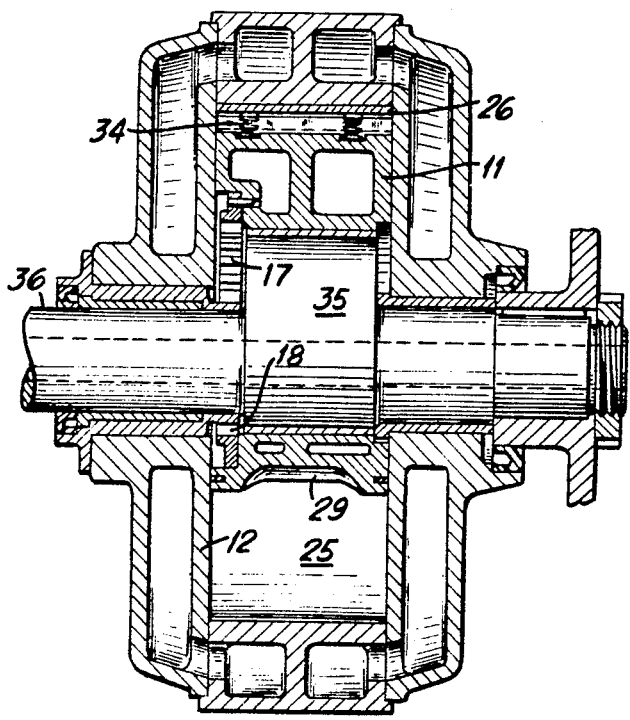

In the drawing:
FIG. 1 shows a diagrammatically a flat hypotrochoidal triangular piston with a two-lobed cavity of a motor block;
FIG. 2 shows diagrammatically one apex of the triangular piston in relation to the inner surface of said cavity;
FIGS. 3 to 6 show in cross section different positions of the hypotrochoidal piston when circulating in the two-lobed cavity of the motor block to form the working chambers for a four-cycle operation;
FIG. 7 shows a cross section through an operative embodiment of our new motor, and
FIG. 8 shows a sectional view along line 8—8 of FIG. 7.

The same reference numerals indicate the same or equivalent elements in all figures of the drawing.

FIG. 1 explains diagrammatically the construction and operation of a trochoid-type combusion engine according to our invention utilizing the kinematic principles referred to above under (a). The engine as shown comprises a triangular hypotrochoidal piston 11 which rotates about its geometrical axis 13 in clockwise direction within the two-lobed cavity of the motor block 12 and additionally about the circle 14 whose center 15 lies in the axis of block 12 thus performing a planetary motion. The radius of circle 14 is equal to the eccentricity 16 of the circular train members 17 and 18 which adapted to create said planetary motion and have a ratio 2:3 so that one revolution of member 18 creates three revolutions of the piston 11. If the smaller train member 18 rolls within the stationary train member 17, any point 19 firmly connected with the train member 18 will describe the hypotrochoidal side faces of the piston 11.

If, however, the large train member 17 rotates on the stationary smaller train member 18 and the hypotrochoidal piston 11 generated as described above is firmly connected with said larger train member 17, then the planetary movement of piston 11 generates the hypotrochoidal envelope 20 defining the shape of the inner surface 22 of the cavity in block 12. The drawing shows in dotted lines a number of positions of the triangular piston 11 within the cavity, some of the positions being indicated only by the position of its apex portion. The hypotrochoidal envelope 20 is distinct from the epitrochoidal trajectory 22 (shown in dotted lines) which would be described by the apex 21 of piston 11. The difference of the curvatures 20 and 22 follows from the fact that any perpendicular line in any point of the envelope 20, necessarily passing through the momentary center of rotation of piston 11, would have to coincide with the respective perpendicular line of the surface of the piston 11 in all its positions. However, FIG. 1 shows that this is the case only if the apex 21 of the piston is in either of the positions indicated I and II.

The triangular piston 11 rotating in the cavity of the motor block 12 in the manner described above forms within said cavity three moving chambers 23, 24, 25 in which in succession suction of the combustion mixture from the intake port 32, compression with following ignition by spark plug 33, and expansion and exhaust through exhaust port 31 occurs.

These working phases of our new invention may be described with reference to FIGS. 3 to 6 as follows:

The succeedingly formed and constantly moving working chambers 23, 24, 25 are in each position sealed from each other by a sealing edge 26 resiliently mounted in each of three apexes of the piston 11 (see also FIGS. 7 and 8). The outer surface of each of these sealing edges 26 is cross-sectionally defined by a hypotrochoidal curve which corresponds to that portion of the hypotrochoidally curved apex portion of the piston which is in constant contact with the surface of the cavity in the casing 12 conforming to the envelope 20 in FIG. 1. Each of the three vault-shaped sealing edges 26 is resiliently guided by means, such as one or more webs 27 sliding in grooves 28 and spring means 34, for displacement in radial direction of the piston as better shown in FIGS. 7 and 8.

All appropriate width $w$ of the sealing edges 26 may be advantageously determined as indicated in FIG. 2 from the greatest value of the changing angle $\psi$ which will be included during the revolution of piston 11 between its axis of symmetry S and the normal line N in the momentary contact place $a$. When the angle $\psi$ is greatest, the distance between the respective contact place $a$ and the apex of the piston will determine one-half of a desirable width $w$ of the sealing edge, the place $a$ in this position of the sealing edge being the most distanced contact place constantly in contact with surface of the cavity in the casing i.e. the envelope 20 in FIG. 1. The thus obtained sealing means are simple in construction, reliable in operation and resistant to wear because they gently and gradually contact the walls of the cavity.

The hypotrochoidal side faces of the piston 11 are provided in known manner with pockets 29 which connect the two portions of the compression chamber 24 formed at the completion of the compression phase (FIG. 5), said pockets providing combustion chambers in cooperation with spark plugs or injection nozzles 33.

According to one feature of our invention these pockets 29 are so arranged on the side faces of the triangular piston 11 between their apexes that in the direction of rotation of the piston the undisturbed length 30 of the forward portions of the hypotrochoidal piston surface amounts to about one-fourth to one-third of the circumferential distance between the two apexes of the piston.

The said undisturbed surface portion 30 permits achieving a high compression ratio and it practically sufficiently separates the exhaust port 31 from the inlet part 32 until the termination of the exhaust. This favorably distinguishes our new motor from motors of the epitrochoidal type which permit only a relatively low compression, and necessarily show an earlier and longer communication between the exhaust port and inlet port resulting in a quite low efficiency particularly at low loads.

FIGS. 7 and 8 show in cross section and in longitudinal section, respectively, an operative embodiment of our invention. The same reference numbers being used in all figures of the drawing, the construction of the motor shown in FIGS. 7 and 8 and its operation will be easily understood in view of the preceding specification. The triangular piston 11 provided at its apexes with resiliently mounted sealing edges 26 performs a combined rotational and planetary motion within the cavity of the motor block 20. This motion is effected by a gear train having a transmission ratio 2:3 and composed of an internally toothed ring gear 17 attached to the piston and inwardly thereof located smaller pinion 18. The piston 11 encompasses slidably an eccentric body 35 which is connected with and drives the motor shaft 36 as the piston 11 is rotated by the combustion gases ignited and expanding after compression. The combustion mixture is introduced through the inlet port 32 into the momentary suction chamber 23, and as the piston 11 rotates the combustion mixture is compressed and finally ignited by spark plug 33. Thereafter the mixture expands in chamber 25 and escapes therefrom through the exhaust port 31. Thus the motor works in four cycles. The motor can of course be built on the diesel principle in which case the inlet port 32 just feeds air and spark plug 33 is replaced by fuel injection means.

While specific embodiments of our invention have been shown and described in detail to illustrate the application of its principles it will be understood that our invention may be differently embodied without departing from such principles and without avoiding the scope of the appended claims.

What we claim as our invention is:

1. In a rotary combustion engine the combination comprising a motor block; a cavity therein having two lobes; a triangular piston having hypotrochoidal side surfaces between its apexes; means imparting to said piston a combined rotational and planetary motion within said cavity, the inner surface of which being the envelope of the actuated piston; an inlet orifice in one lobe and an outlet orifice in the other lobe; the greatest distance between any part of said inlet and outlet orifices not exceeding the circumferential distance between apexes of the piston; a sealing edge resiliently mounted in each apex of the piston for displacement in radial direction thereof; and having a vault-shaped hypotrochoidal sealing surface conforming to and supplementing the hypotrochoidal side surfaces of the piston; and pockets depressed in said side surfaces serving as combustion chambers.

2. A rotary combustion engine according to claim 1 comprising at least one web on each sealing edge and a groove in the piston receiving and guiding each web.

3. A rotary combustion engine according to claim 1 wherein said depressed pockets are eccentrically arranged on each hypotrochoidal side surface of the piston leaving in the direction of rotation of the piston a greater undisturbed surface portion in front thereof.

4. A rotary combustion engine according to claim 3 wherein said frontal undisturbed surface portion amounts to about between one-fourth to one-third of the said side surface.

References Cited

UNITED STATES PATENTS

| | | | |
|---|---|---|---|
| 2,988,008 | 6/1961 | Wankel | 103—130 |
| 2,988,065 | 6/1961 | Wankel et al. | 103—130 |
| 3,009,421 | 11/1961 | Livermore et al. | 103—135 |
| 3,120,815 | 2/1964 | Froede | 123—8 |
| 3,180,564 | 4/1965 | Fuhrmann et al. | 123—8 |
| 3,204,615 | 9/1965 | Starmuehler | 123—8 |

FOREIGN PATENTS

| | | |
|---|---|---|
| 1,324,958 | 3/1963 | France. |
| 1,145,432 | 12/1960 | Germany. |
| 583,035 | 12/1946 | Great Britain. |
| 1,003,613 | 9/1965 | Great Britain. |

ROBERT M. WALKER, *Primary Examiner.*

WILBUR J. GOODLIN, DONLEY J. STOCKING,
*Examiners.*